US008160909B2

(12) United States Patent
Voda et al.

(10) Patent No.: US 8,160,909 B2
(45) Date of Patent: Apr. 17, 2012

(54) SITE OPTIMIZER

(75) Inventors: Matthew John Voda, Minneapolis, MN (US); Nicholas Joseph Sieger, Minneapolis, MN (US)

(73) Assignee: Digital River, Inc., Minnetonka, MN (US)

( * ) Notice: Subject to any disclaimer, the term of this patent is extended or adjusted under 35 U.S.C. 154(b) by 859 days.

(21) Appl. No.: 12/026,541

(22) Filed: Feb. 5, 2008

(65) Prior Publication Data
US 2008/0189156 A1    Aug. 7, 2008

Related U.S. Application Data

(60) Provisional application No. 60/888,519, filed on Feb. 6, 2007.

(51) Int. Cl.
*G06Q 10/00* (2012.01)
(52) U.S. Cl. ............... 705/7.11; 705/348; 705/14.13; 705/14.41; 705/32; 708/1
(58) Field of Classification Search .......... 705/7
See application file for complete search history.

(56) References Cited

U.S. PATENT DOCUMENTS

| | | | |
|---|---|---|---|
| 6,587,849 B1 | 7/2003 | Mason et al. | |
| 7,130,808 B1* | 10/2006 | Ranka et al. | 705/10 |
| 7,584,435 B2* | 9/2009 | Bailey et al. | 715/788 |
| 7,761,457 B2* | 7/2010 | Error et al. | 707/754 |
| 2002/0019820 A1 | 2/2002 | Marcus et al. | |
| 2002/0035560 A1 | 3/2002 | Sone | |
| 2003/0023567 A1 | 1/2003 | Berkovitz et al. | |
| 2003/0167259 A1 | 9/2003 | Casson et al. | |
| 2006/0123340 A1* | 6/2006 | Bailey et al. | 715/700 |
| 2006/0271671 A1* | 11/2006 | Hansen | 709/224 |
| 2006/0277212 A1* | 12/2006 | Error | 707/102 |
| 2006/0277585 A1* | 12/2006 | Error et al. | 725/112 |
| 2007/0011304 A1* | 1/2007 | Error | 709/224 |
| 2007/0124192 A1* | 5/2007 | Moatti | 705/10 |
| 2007/0130090 A1* | 6/2007 | Staib et al. | 705/400 |
| 2008/0183858 A1* | 7/2008 | Error | 709/224 |
| 2008/0184116 A1* | 7/2008 | Error | 715/704 |
| 2009/0125482 A1* | 5/2009 | Peregrine et al. | 707/3 |
| 2010/0251130 A1* | 9/2010 | Error et al. | 715/739 |

FOREIGN PATENT DOCUMENTS

EP             959601 A1 *  11/1999

OTHER PUBLICATIONS

"How and Why to Clear your Cache," Microsoft Inc. Last updated Jun. 30, 2006. Available from: <http://www.microsoft.com/windows/ie/ie6/using/howto/customizing/clearcache.mspx?pf=true>.*
Internet Archive Wayback Machine archive of "A/B Testing". Archived Jan. 9, 2007. Available from <http://web.archive.org/web/20070109170848/www.sitetoolcenter.com/google-adsense-optimization/ab-testing.php>.*
Internet Archive Wayback Machine archive of "A-B Split Testing and Multiveriate testing". Archived Aug. 27, 2006. Available from <http://web.archive.org/web/20060827062119/www.conversionmultiplier.com/website/why-not-ab-testing.html>.*
Art Technology Group, ATG Dynamo 5 Business User's Guide Version 5.6. Revised Dec. 10, 2001. Cambridge, MA.

* cited by examiner

*Primary Examiner* — James A Reagan
(74) *Attorney, Agent, or Firm* — North Oaks Patent Agency; Shawn B. Dempster; Lynn M. Holly

(57) ABSTRACT

Site optimizer is a tool that enables A/B testing of merchandising offers for your online store to help you determine which offers work best on your storefront. A/B testing compares multiple offers simultaneously to randomly selected groups of shoppers. The A/B testing approach provides a unique and effective way to optimize online store performance because it is metrics-driven, objective, and more efficient than other site optimization techniques.

20 Claims, 14 Drawing Sheets

Create New Offer

Type  Behavior  Products and Pricing  Display Content  Review

Product Options

Products:  ◉ Individual Products
 ○ All Products

Offer Controls

Usage Controls: ☐ Limit Total Usage

Locale Restrictions: ◉ Allow Offer on All Locales
 ○ Restrict Offer to Specific Locales

Create New Site Optimizer Test

The Test Types below are used to guide the setup of the Site Optimizer test and to determine which merchandising offers to include as possible test cells. You must create merchandising offers and set them to "Site Test" in the Offer Triggers section before you can create a Site Optimizer test. Select a Test Type that matches your testing approach and click Next to continue with the setup.

Type  General Information  Cells  Summary

* Test Type:
  ○ Content
  ○ Product Discount
  ○ Order Discount
  ○ Product Shipping Discount
  ○ Order Shipping Discount
  ○ All Cross-sell / Up-sell / Bundle
  ○ Siteflow

NOTE: At least one merchandising offer of the desired test type must be set to "Site Test" in order for the corresponding radio button above to be enabled.

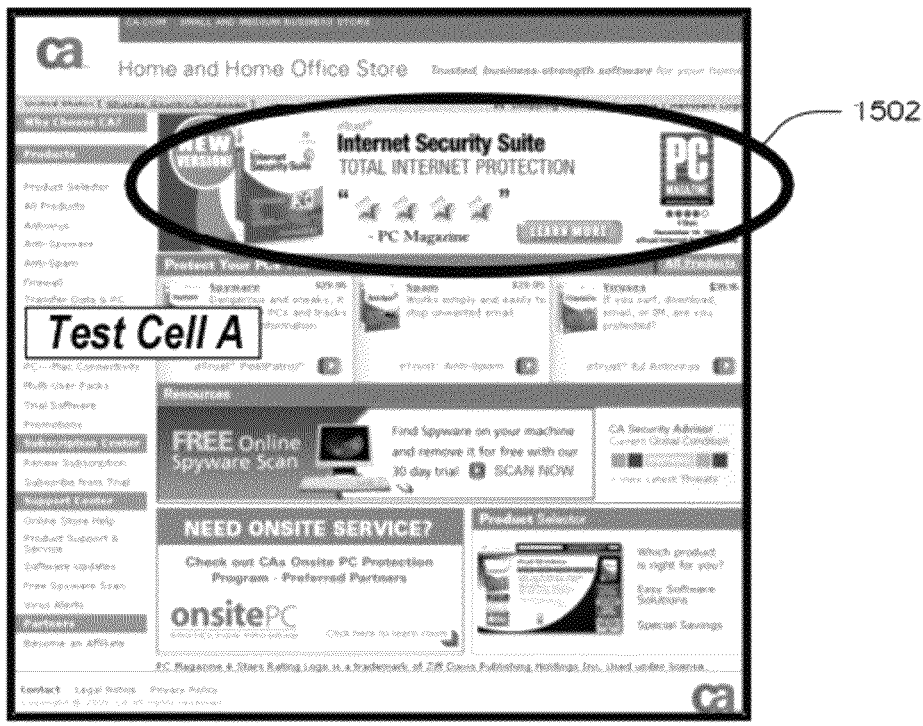
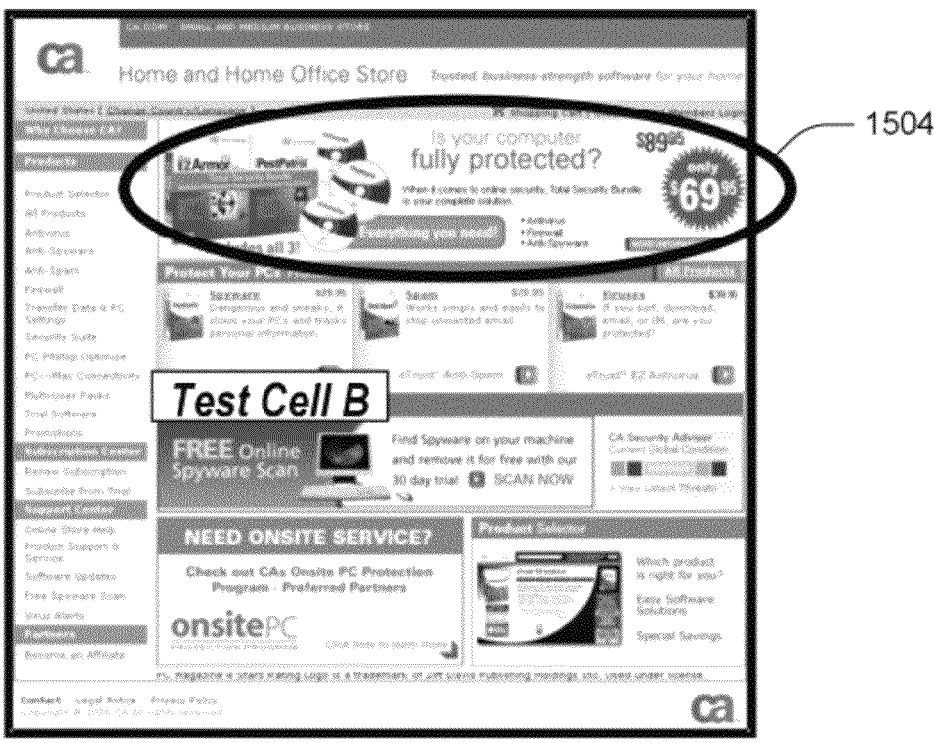
FIG. 15

FIG. 16

SITE OPTIMIZER

This application claims the benefit of U.S. Provisional Application No. 60/888,519 filed Feb. 6, 2007 entitled "Site Optimizer."

FIELD OF THE INVENTION

The present invention relates to electronic commerce systems for use on the internet. More particularly, the present invention relates to a system and related tools for enabling concurrent testing of merchandising offers and siteflow sequences.

BACKGROUND OF THE INVENTION

The E-business marketplace is highly competitive. A strong online marketing strategy is one key to a successful e-commerce business. Site operators often need to know what kind and combinations of content, design and flow will most appeal to their customers and differentiate their offers from those of their competitors. More importantly, they want to know which combinations produce the best browse-to-buy conversion rate. Generally, system operators want to test for one or more of the following reasons:
  Determine Best Design
  Find Optimized Pricing
  Test New Ideas Before Making Full Commitments
  Increase Conversion Rates
  Offer Best Products & Services
  Match Promotions with Customer Wants, Needs
  Improve Retention Rates
  Maximize Advertising Effectiveness
  Drive Top-Line Revenue Growth
  Localize for the Right Audience A need exists for a rich set of site testing remote control tools that site operators and marketers can use to test and optimize site performance across a number of areas: pricing, cross sell/up sell products, content displays, page flow, product offers and more.

One of the most common types of web site testing is known as serial testing (shown in FIG. 1) where a webpage design is tested one week in one configuration and then switched to another design the following week and tested.

Another type of test is A/B testing as shown in FIG. 2. A/B testing has several advantages over serial testing; most particularly, the availability of a controlled environment leading to valid data that can be used to make optimal business decisions. A/B testing provides an effective way to optimize online store performance because it uses principles of experimental design, is metrics-driven, objective, and more efficient than other site optimization techniques.

In its simplest form, A/B testing allows the user to randomly display several content, pricing or promotional offers simultaneously on the storefront while testing the impact of each approach. For example, if a user wanted to determine the best use of a promotional banner area on the store home page, s/he might set up two different creative designs and show each to 50% of the store traffic over a period of time. A/B testing can be configured with two or more test cells, and split into any kind of traffic segmentation the user deems appropriate. For instance, if a user knew that a particular approach would be more popular than the others, s/he could set up the more popular version to run for a larger percentage of traffic in order to maximize revenue while completing the test. The user would then measure the close ratio (conversion rate) and sales revenue impact of each design.

Another benefit of this approach is that all other factors are controlled (referring traffic source, other store promotions, etc.) because traffic is randomly assigned to each of the test designs. This strategy yields an objective measurement; data with which real quality decisions may be made. Additional benefits are faster test results and statistically accurate tracking which in turn leads to higher quality business decisions.

Data from each A/B test cell (a branch or version of the test) becomes the basis for which test cell is determined the strongest or highest performing. Some common measures of test performance for an online store are: close ratio, sales revenue, number of sales, average order size, and sales per unique visitor. Close ratio and sales per unique visitor are usually the most important metrics for A/B testing because they show the actual revenue impact of a test and allow the user to compare the results of each test cell even if one test cell received more traffic or views than another.

When reading test results, it is critical to evaluate the statistical significance of the data in the test. The statistical significance is a measure of whether the lift or gain seen in a particular test cell is actually statistically valid within a certain confidence level. Think of this as similar to election night results that are within a certain margin of error. If the results are too close to call and fall within the margin of error, the user may not be able to make a determination of the winner. Statistical significance is similar, in that if test cells are too close across close ratio and revenue per visitor terms, it is difficult to make a good decision about which test cell is the winner because the difference in performance of any particular cell is not statistically different than the other cells.

A/B testing often requires creation of static web pages that further require development resources in order to create links between the test offer and the shopping cart. These links ensure that the shopper views the offer and receives the attributes (i.e. pricing) contained in it rather than those of the standard offer.

A need exists for improved testing tools for e-commerce system users. The present invention provides a solution to these needs and other problems, and offers other advantages over the prior art.

BRIEF SUMMARY OF THE INVENTION

In a preferred embodiment, the objective is to give an e-commerce system user a site optimizer toolset that enables A/B testing of an online store, along with tracking and analysis of results. This toolset can be integrated with existing merchandising offer functions in a commerce system to allow users to set up offers, offer related content, pricing and product information to use specifically for testing. Once these offers are created, they can be included in the test setup and deployment on the store. When the test is live on the store, the commerce system captures key measures of performance for each test cell within the test and automatically computes the statistical significance of the results. This provides the ability to efficiently and quickly decide on a winning test cell.

The preferred embodiment toolset uses a randomization mechanism to assign test cells to shoppers. Randomization supports the control of the variables used to calculate the statistical results. It greatly increases the ability to generalize the results by making the different test cells groups representative of the population of shoppers.

A graphical user interface is provided to users that allow each user to select from a library of offer types and change merchandising test variables such as price, content, shopper behavior and product bundles. The user can set the test parameters, start and end the test, view test results as the test continues or when it completes, and promote or retire test cells that are no longer used.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 6 illustrates additional offer options.

FIG. 7 illustrates pricing and discount options.

FIG. 8 shows a preferred embodiment Create New Site Optimizer test creation screen.

FIG. 9 shows a preferred embodiment General Information screen for configuring a Site optimizer test.

FIG. 10 shows a preferred embodiment Cell (offer) listing and segmentation screen for configuring the Site optimizer test.

FIG. 15 shows A/B test cells from the user's point of view.

FIG. 16 shows a preferred embodiment site optimizer summary screen which allows the user to manually promote a cell.

DETAILED DESCRIPTION

Figure 1:
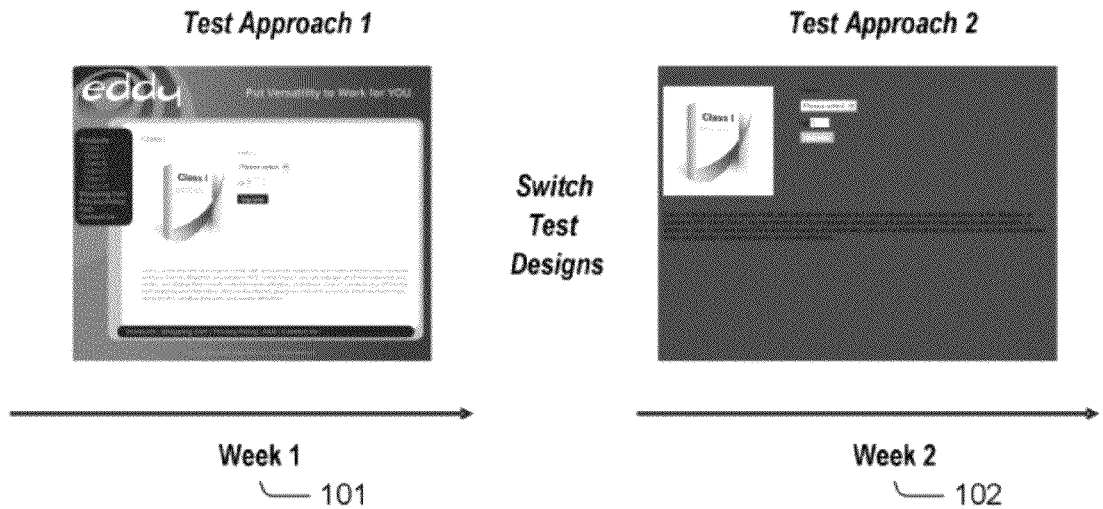
FIG. 1 illustrates a model of a standard serial testing approach.
Figure 2:
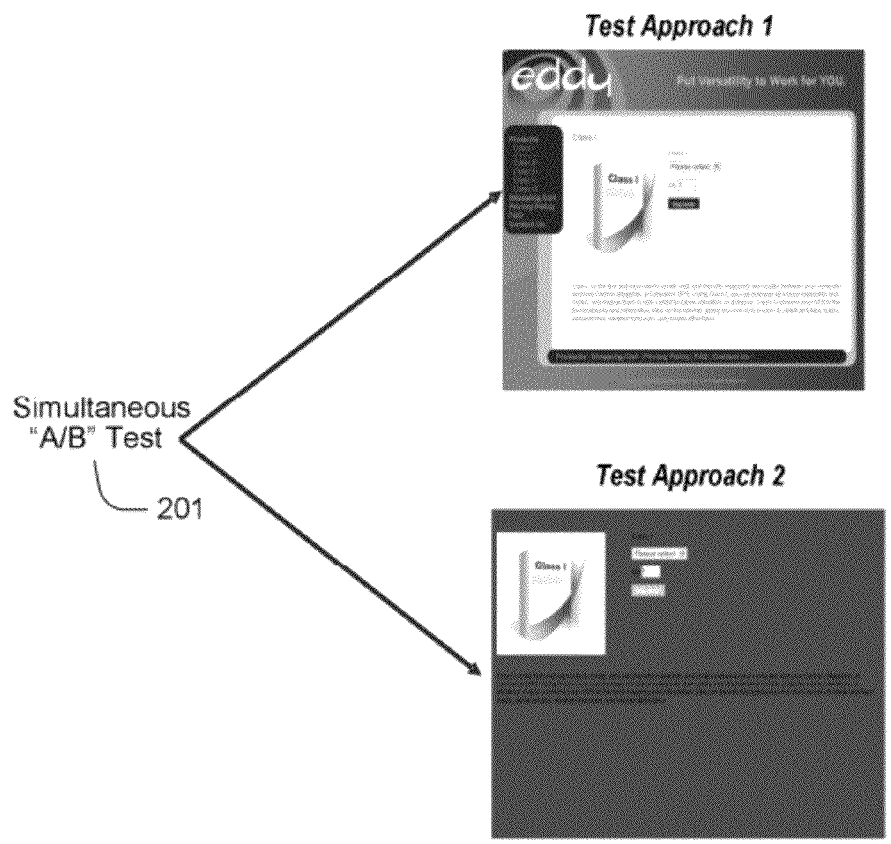
FIG. 2 illustrates a model of the A/B testing approach.

In the preferred embodiment of the invention, the site optimizer uses merchandising offers or siteflow design in testing one or more test types. Example of test types include merchandising offers (e.g. product discount and pricing, order discounts, content, cross sell, up sell, bundles and shipping offers) and siteflow. Merchandising offers provide all shoppers with the same page, but with different dynamic content. Siteflow tests provide shoppers with different pages. For instance, an example of a site flow test would be a one page checkout versus the standard three page checkout sequence. Siteflow tests cannot be configured by the user alone, as they do require the help of a web page designer. Listed below are a few of the commonly used terms for the preferred embodiment of the Site optimizer system and method.

Common Terms

A/B Test: A method that allows a head-to-head test of a single variable, and allows control of all extraneous factors by randomizing traffic and/or viewership of the test, and by changing only one variable for the test.

Cell: A merchandising offer in a testing state that is being tested against other "test cells."

Cell Assignment: The test cell randomly selected for the shopper to view.

Champion/Challenger: A test that pits a series of test sides (challengers) against a default or accepted approach (champion).

Global Commerce System: An enterprise-wide, full featured e-commerce platform. The Global Commerce System consists in part, of the web application, an administrative platform for managing client sites, products, orders and offers, and a best-in-class enterprise e-commerce system.

Merchandising Offer: A promotion or discount offered to a shopper in order to entice them to make a purchase.

Points of Promotion (PoP): A PoP is a piece of 'real estate' on a web page in which content is dynamically placed. PoPs are created by web designers, but the content is controlled by the site operator. For example, a home page may display a banner. The location of the banner is a PoP. The content placed in that location can be set or changed by the site operator.

Requisition: An order. A requisition is created whenever something is added to the shopping cart. If the user leaves without completing the order, the requisition is cancelled.

Test Cell: A single node of the test. It can be either a champion or challenger, but usually refers to challenger tests. Test cells in the preferred embodiment are specific merchandising offers or default behaviors (such as list price). Each test cell is designated as either a 'test' or a 'control.' There is one 'control' test cell per test.

Segmentation: A technique used to pre-define a group of customers that will receive a specific site test. The segments or groups can be defined based on session characteristics and/or past behaviors. Segmentation as used in the preferred embodiment is based on a true randomization of test cells. The site operator configures the traffic segmentation by assigning percentages to each test. The total percentage must be 100%, so all visitors are directed to one of the test cells.

Session: The unique shopper's interaction with the site from start to end.

Site Operator: The site operator maintains the e-commerce site, including configuration of all offers, selection and maintenance of PoP, etc. This term is used interchangeably with "user."

Site Optimizer Testing

Merchandising Offers

Figure 3:
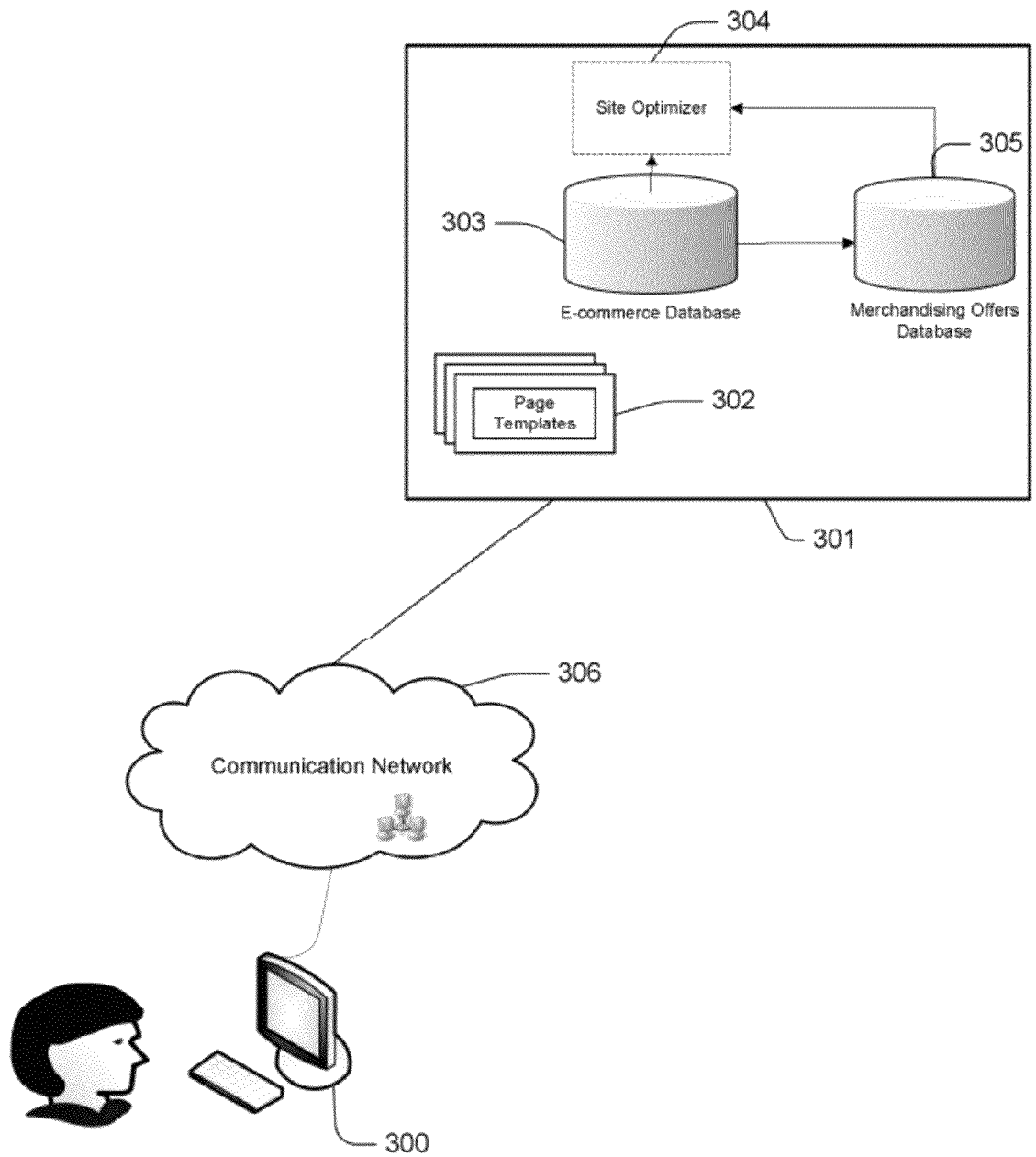
FIG. 3 illustrates an overview diagram of a preferred embodiment site optimizer system and method.
Figure 4:
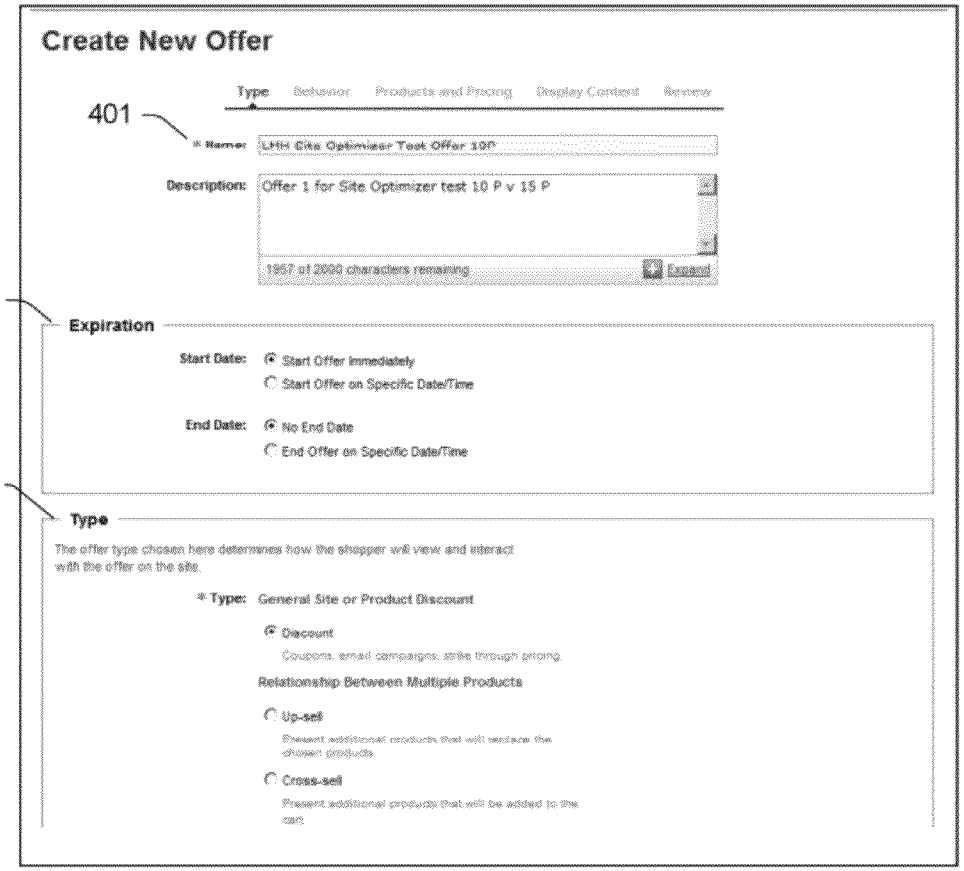
FIG. 4 shows an offer creation screen and process.

As shown in FIG. 3, the user through a local system 300 creates an offer in the preferred embodiment site optimizer merchandising offer test using a Command Console Application graphical user interface on the Global Commerce System 301. The local system 300 is coupled through a communication network 306 (e.g., the internet) to the Global Commerce System 301. The Global Commerce System 301 consists of typical e-commerce systems components such as a page template repository 302, an e-commerce database 303 and a merchandising offer database 305. The site optimizer 304 interacts with an e-commerce database 303 and a merchandising offer database 305 in much the same process that a user creates regular offers displayed on the site. The graphical user interface (GUI) takes the user through a series of screens to set up offer parameters. As shown in FIG. 4, creating an offer involves naming the offer 401, selecting time parameters (when to begin and end the offer) 402 and offer type (e.g. discount, up sell/cross sell, or feature products) 403.

Figure 5:
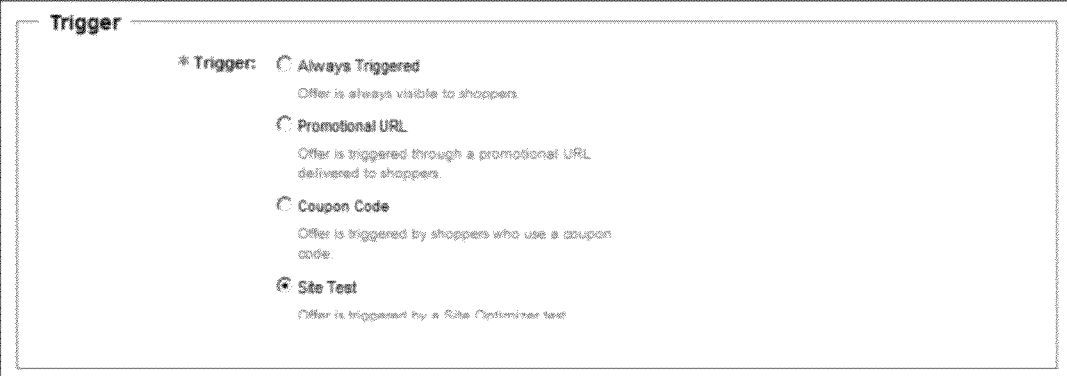
FIG. 5 shows the offer trigger used to control offers displayed on the site.

As shown in FIG. 5, an offer trigger 501 used to control offers displayed in the merchandising system is leveraged to control which offers can be used in Site optimizer tests. The trigger option "Site Test" must always be chosen in order to be available for Site optimizer tests. In the described implementation, the user may not choose from offers that were created using a different trigger. Generally, offers must be created with the "Site Test" trigger from the beginning. There is one exception to this requirement, however. The user may change the offer trigger from "Always Triggered" to "Site Test" before an offer is deployed for the first time.

Figure 7:
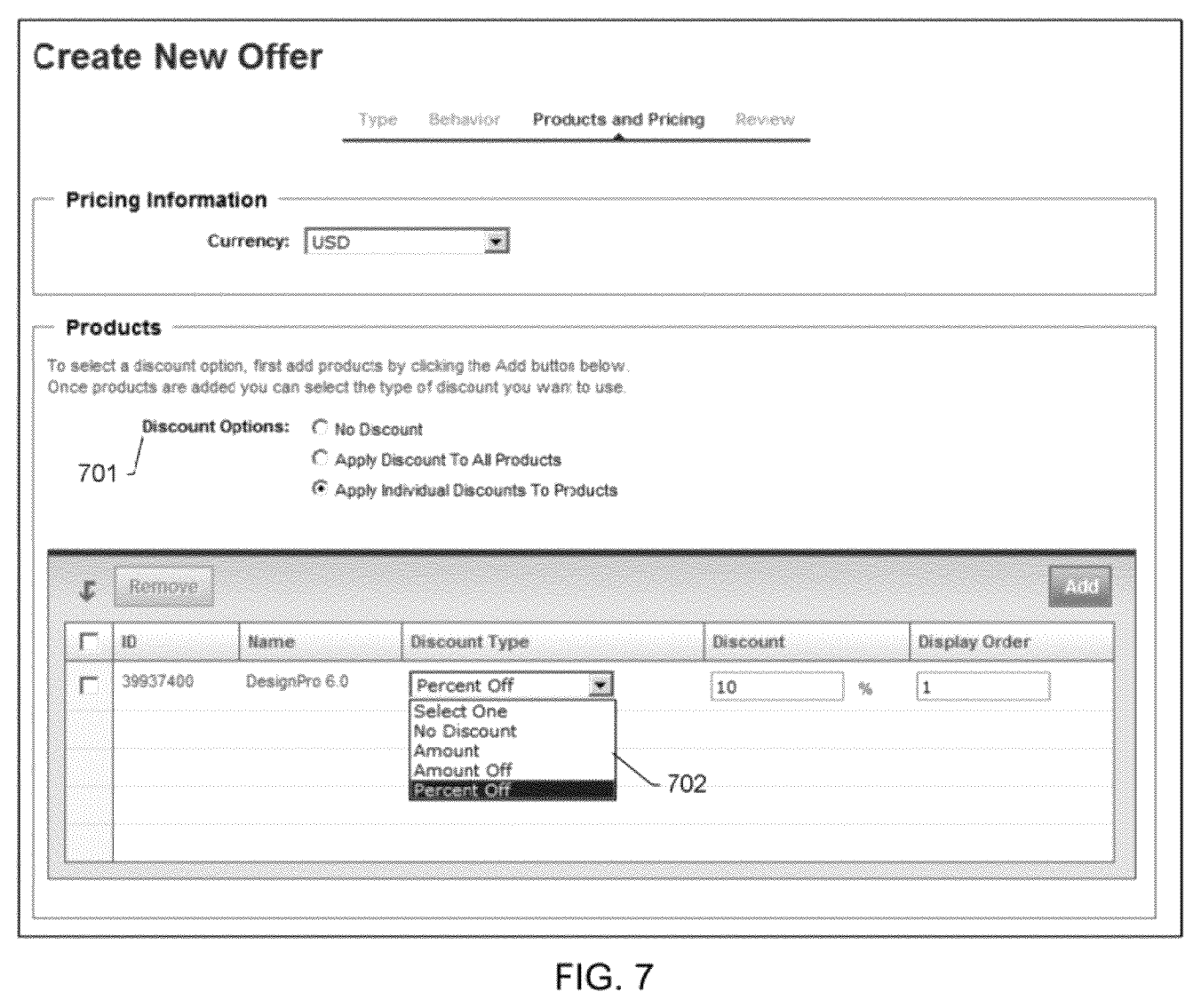

As shown in FIG. 6, the user chooses from a variety of offer options, including product options and offer controls 601. A user with sites in several locales may choose specific locales in which to test, or test in all locales. Depending on the type of offer selected, the wizard guides the user in adding predefined products and discount and display parameters to the offer. As shown in FIG. 7, pricing and discount information is added, if appropriate. This includes discount options 701 and discount types 702. Offers are deployed prior to being added to site tests.

Offer validation occurs at the time of deployment of the site test and warnings are displayed if possible collisions exist. Validation includes product price collisions, shipping pricing collisions, product association collisions, content and product feature collisions, order level discounts and user-triggered prices. If the system detects any potential offers on the site that may interfere with the test, it will display those offers at the top of the Summary page. It is possible to have merchandising offers on the site that may compete or conflict with a test.

The site's shopping cart normally uses an offer arbitration method to determine which offers are presented to the shopper. Generally, when a site has multiple offers, the offer that provides the best price or discount to the shopper is always used. The offer arbitration system runs each time the order pricing is calculated, and the winning offer is applied to the order until arbitration occurs again (e.g. with change in quantity, addition or removal of products, change to shipping or billing information, and other shopping cart parameters). However, if the shopper is assigned to a test cell which has a test offer, that will take precedence over live site-wide offers. If there are live offers which may interfere with a test, a message displays when the user configures the test. The user will also be informed on the "Offer Edit" screen that editing the offer may invalidate the test results if the offer is part of an active Site optimizer test. Shopper-triggered offers compete normally with test offers.

For example, a merchandising offer with a discount to Product A of 50% may exist on the site and a test cells containing price discounts for Product A of 10% and 20% would be superseded by the 50% discount. This condition would impact the test results, and therefore it is always advised to check the offers shown in the list at the top of the page to determine any possible conflicts with a test.

Merchandising offers that are shopper-triggered do not typically represent a test risk since the shopper can only trigger these offers by way of a coupon code or offer ID in a URL. However, merchandising offers set to "Always Triggered" will be subject to best price arbitration and can therefore compete with the offers you include in your test.

Shopper-triggered offers compete normally with test offers. A warning displays to the user during set up if there are live offers which may interfere with a test. In addition, the user will be informed on the "offer Edit" screen that editing the offer may invalidate their test results if the offer is part of an active Site optimizer test.

When a site optimizer test is running, all offers of the same type as the offers in the test are temporarily suspended. This is so the test can run without interference.

Once the offers have been created, the user navigates to the Site optimizer module to create the test (FIG. 8). The system detects the type of offers that have been created for the site, and displays test types with open radio buttons for those that are available for those offers 801. Radio buttons for all other test types are disabled.

Figure 9:
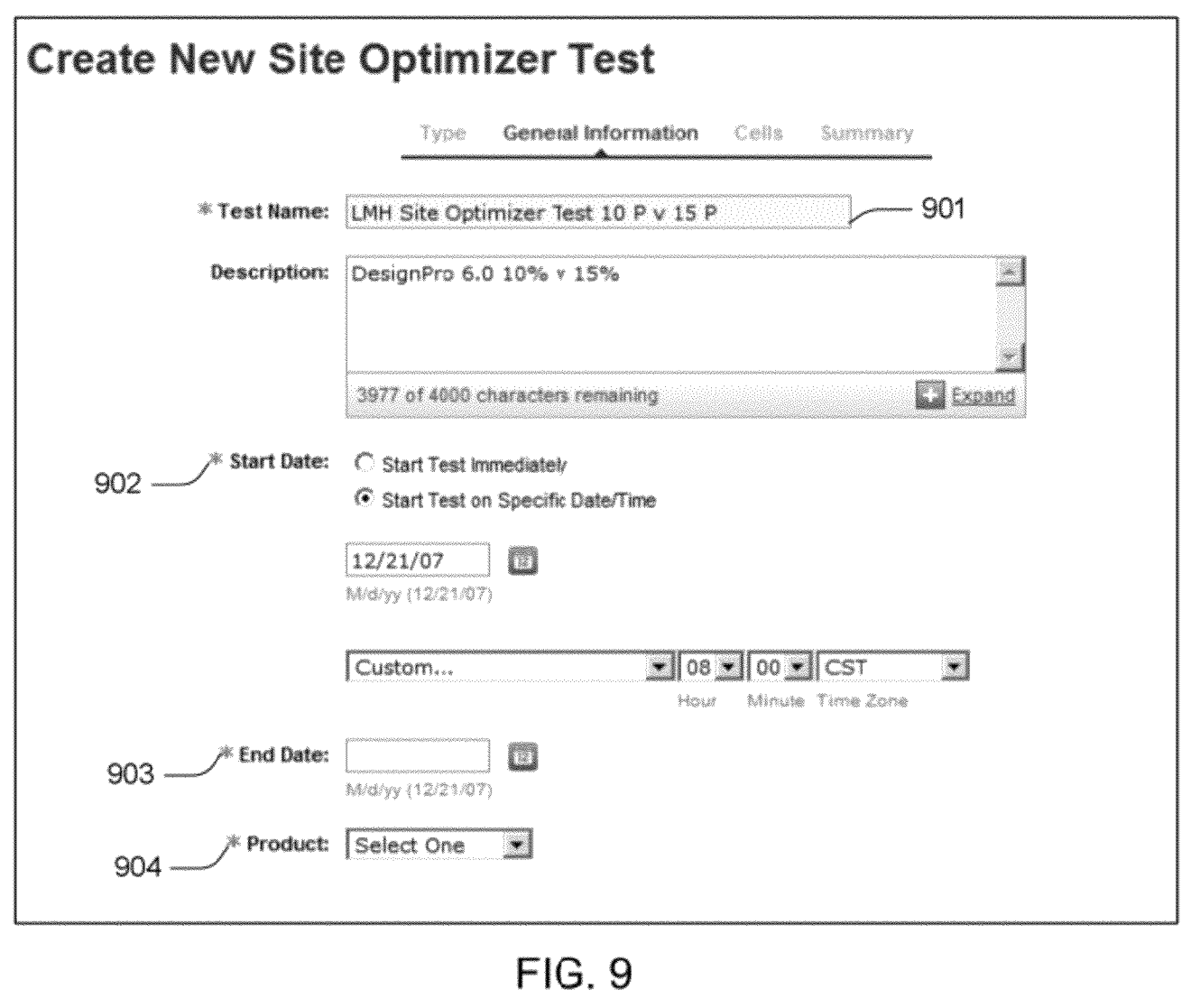

Referring to FIG. 9, tests are created 901 by selecting test type, start and end dates, and product to be tested. Table 1 describes some of the types of test that can be performed using a preferred embodiment of Site optimizer. Table 2 describes the types of tests and the type of merchandising offer each test is normally associated with. Note that there are some restrictions as to the offers that a test type can use. Once the test type is selected, the remaining screens are customized for the test type selected.

TABLE 1

Test Types

| Test type | Additional definition | When to mark as viewed | Offer Restrictions |
|---|---|---|---|
| Product discount | Select product | View price for selected product (anywhere on site)/add selected product to cart | Must be Default OfferType with only selected Product as child product |
| POP Content | Select POP | View selected POP | Must be HotProducts, FeaturedProducts, TopN, Banner OfferType. Must only be associated with selected POP |
| Cross-sell/Up-sell | Select product | Click add to cart button for selected product | Must be Cross-Sell or Up-Sell OfferType. Must have only selected product as driver |
| Order shipping discount | n/a | Create cart | Must be a Shipping OfferType. Must have an order-level discount. |
| Product shipping discount | Select product | Add selected product to cart | Must be a Shipping OfferType. Must have only the selected product. |
| Order discount | n/a | Create cart | Must be Default OfferType. Must have an order-level discount. |
| Siteflow | n/a | Site design determines via jsp tag or action handler | n/a - no offers are used |

TABLE 2

Offer types available with test types

| Site Optimizer Test Type | Merchandising Offer Type | Definition |
|---|---|---|
| Content | Default Feature Products Hot Products Top N | Measuring the effectiveness of a store home page banner Point of Promotion by testing three different creative designs |
| Product Discount | Banner Cross-Sell Up-Sell Feature Products Hot Products | These tests involve specific products' discounts. For example, test the sales performance of Product A at 5% Off Discount versus 10% Off and 25% Off. |

TABLE 2-continued

Offer types available with test types

| Site Optimizer Test Type | Merchandising Offer Type | Definition |
|---|---|---|
| Order Discount | Default | Compares the impact of half of your shoppers receiving a "10% Off your entire order" promotion versus the other half receiving a "20% off your entire order." |
| Product Shipping Discount | Shipping Individual Product Shipping Product Present Shipping Product Present + Destination + Shipping Method | Test of free ground shipping for Product A versus 50% overnight shipping for Product A to determine best sales per visit performance. |
| Order Shipping Discount | Shipping Order Value Shipping Order Value + Destination Shipping Order Value + Shipping Method | Test of free ground shipping for all orders versus 50% overnight shipping for all orders to determine best sales per visit performance. |
| Cross Sell/Up Sell/ Bundling | Cross-Sell Up-Sell Bundling | Test the cross sell of Products 1 & 2 with Product A, versus cross selling Products 3 & 4 with Product A. Determines which children products have the best cross-sell attachment rates. |

Figure 10:
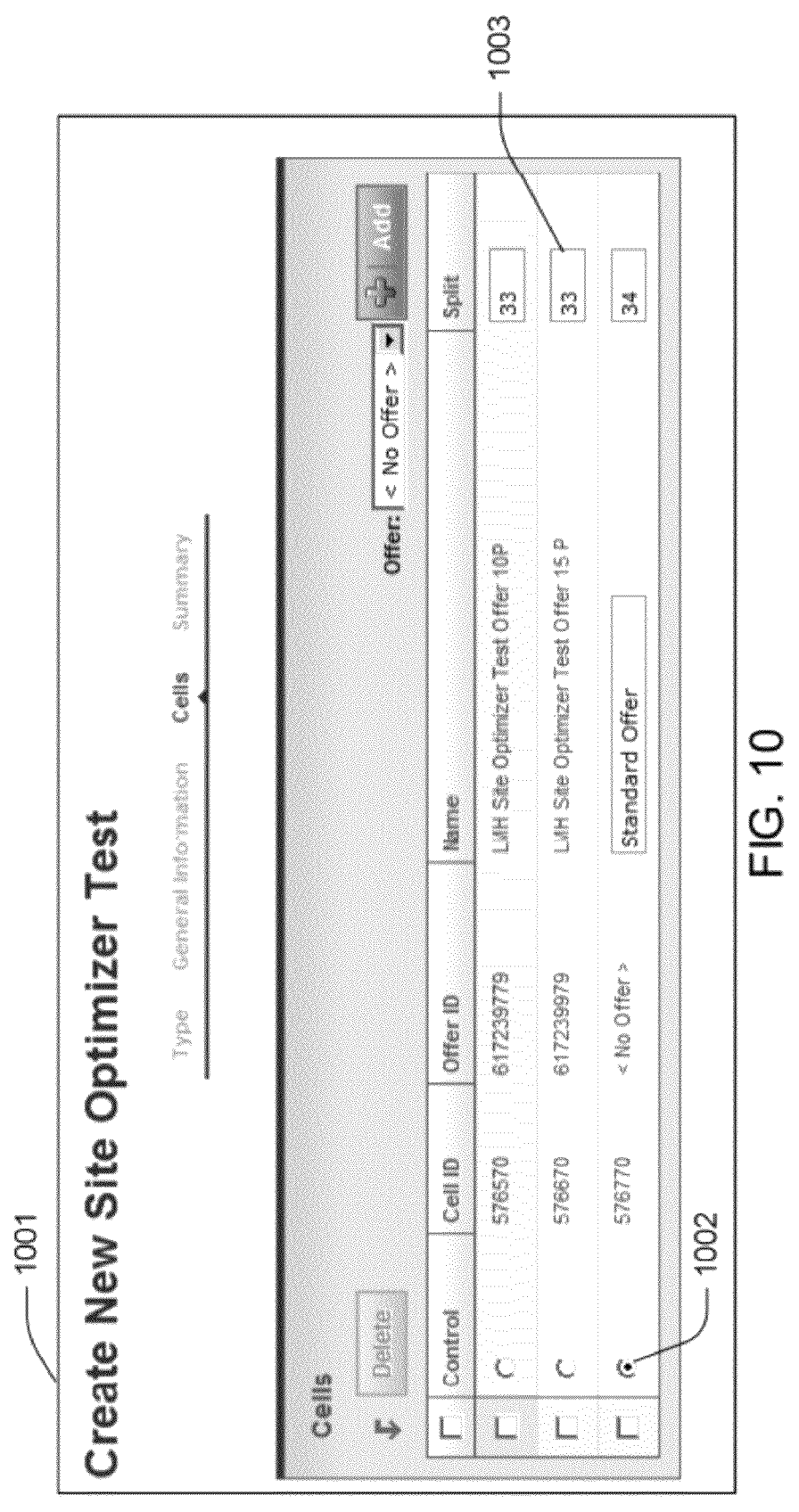

Referring to FIG. 10, the wizard guides the user through configuring the test; and assigning offers to test cells 1001. The user chooses a control 1002. One control is required as a reference in each test. The user sets traffic (or cell) segmentation percentages 1003. Split percentages do not have to be equal; if the user knows that one of the cells is likely to be more effective in encouraging sales, s/he may want to provide a higher percentage in order to maximize the revenue from that cell.

Figure 11:
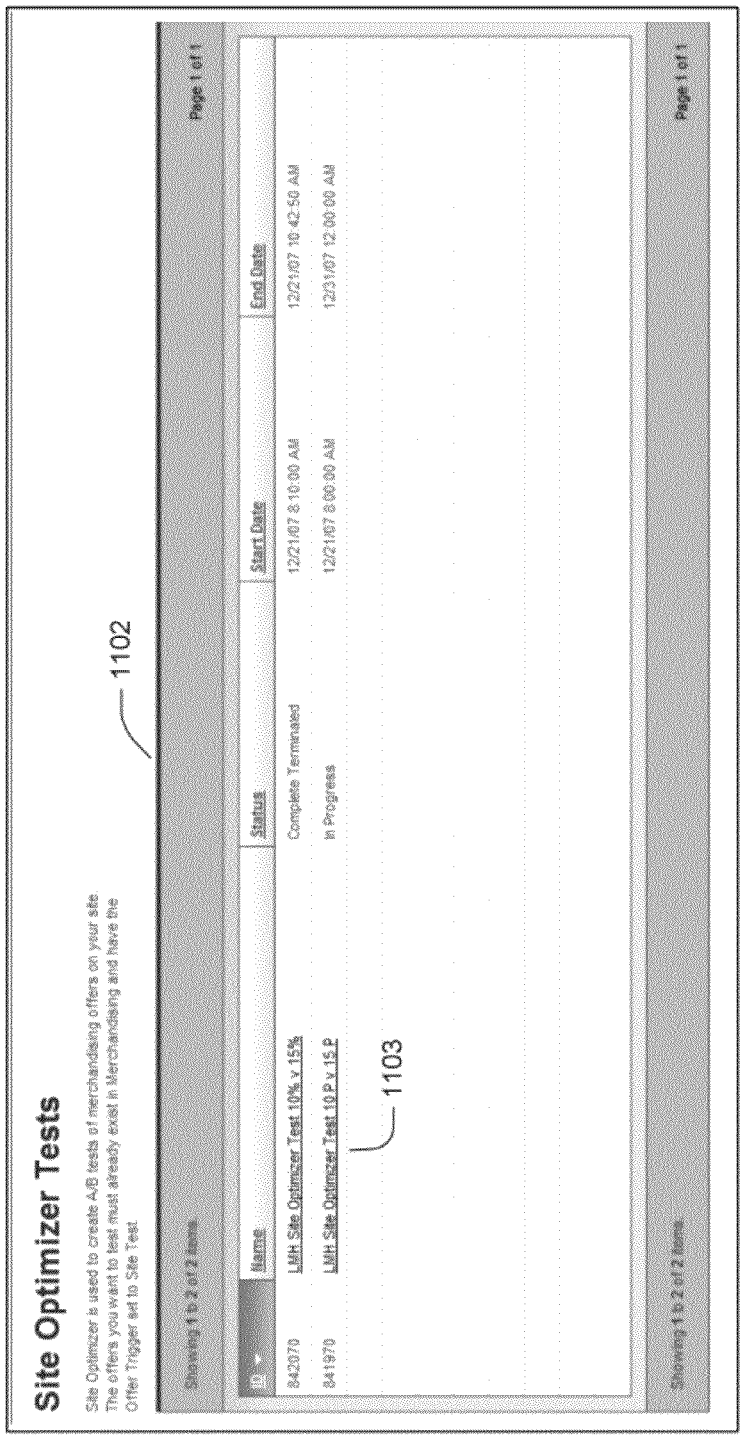
FIG. 11 shows a preferred embodiment Site Optimizer Test listing screen.

The Site Optimizer Tests listing page shown in FIG. 11, displays all past, pending and in-progress Site optimizer tests for a site. The listing entry for a site includes the status, or stage of the test 1102. Stages are described below. To view the results of a test, the user can click on the ID or Name from the list page 1103. See Viewing Performance below.

Figure 12:
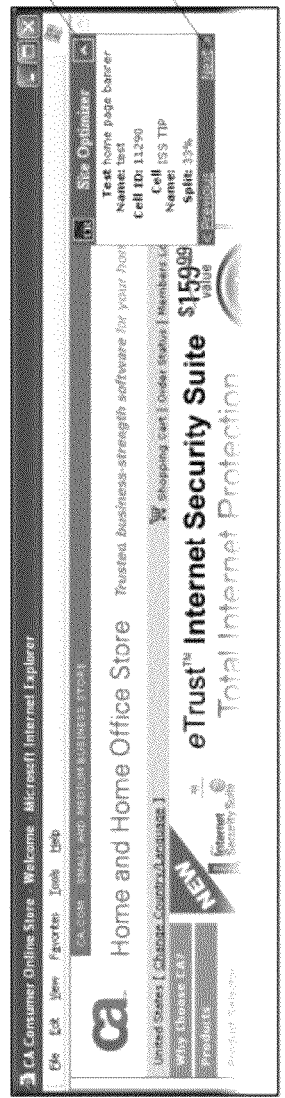
FIG. 12 shows an example of the test preview function.

When the user is finished configuring the test, the test may be previewed or deployed immediately. An example mock-up of this is shown in FIG. 12. The preview action 1201 is available in the site test edit screens. This function sets up the preview and escorts the user to the storefront, where s/he can navigate the site, browse the effects of the test, and cycle through test cells 1202. Previewed tests are not visible by any storefront session other than the one that was started with the site optimizer preview button. Test cell assignments are created as part of previewing a test, but they will not be marked as viewed and they do not count toward the test metrics. Preview must be accessed prior to completing the test set up.

In order to enable the preview cell selector on the storefront, a single custom Java server page (JSP) tag needs to be added in the HTML <head> section of all templates and/or site implementations. Ideally the tag should be added in the common base templates and added to site implementations that customize the <head> section of the document as needed.

The custom tag is called <dr:defineAdminJavascript/>, and needs to additional attributes or content. The tag normally does nothing, but under the special case where the site is being previewed or tested from the control console, it will emit a single <script> tag similar to the following:

```
<script language="javascript" type="text/javascript"
src="/drcc/ent/adminJavascript.do?PageID=
    123456&SessionID=56798200">
</script>
```

Suggested placement for the custom tag is in the Top-Header content element, between the inclusion of the StyleSheet and Javascript content elements as follows:

```
<dr:url contentElement="true" rscName="StyleSheet/>
<dr:defineAdminJavascript/>
<dr:url contentElement="true" rscName="Javascript"/>
```

Figure 13:
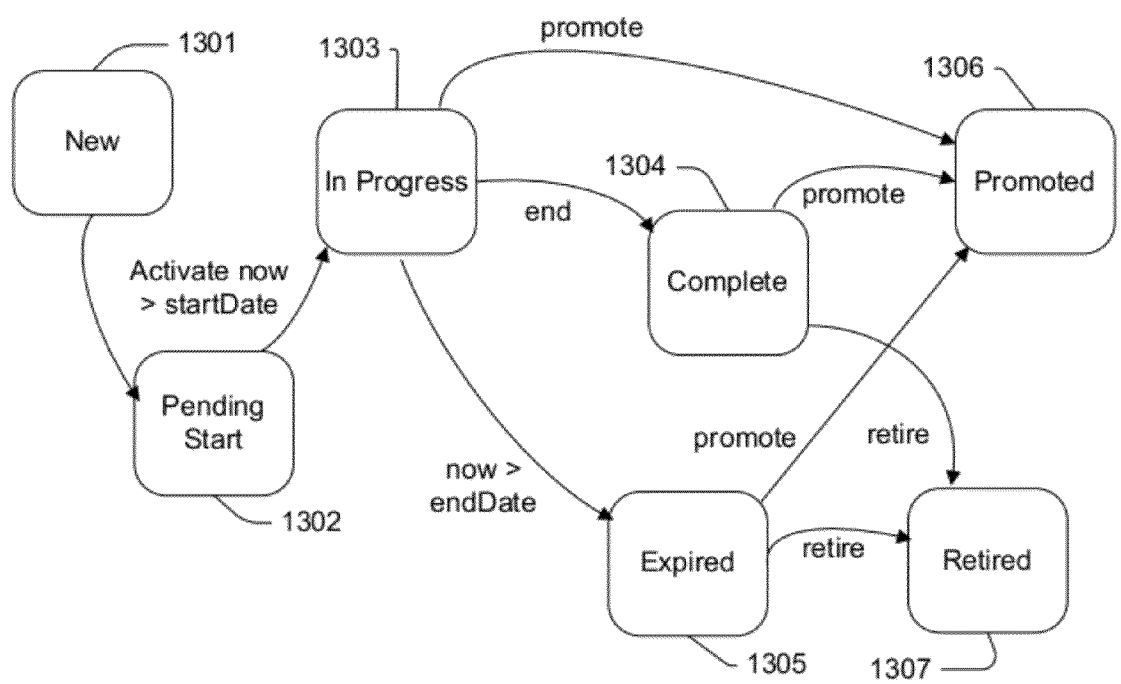
FIG. 13 is a state diagram showing the various states possible for a site optimizer test.

Referring now to FIG. 13, test cells can be in any one of seven stages. The characteristics of each state are described in Table 3, below. The figure diagrams the change of state as tests are created and deployed. New 1301 tests convert to a Pending Start 1302 state when set up is complete, but the tests have not been deployed. Once a test has been deployed and activated on the site, it is In Progress 1303. A test In Progress can Expire 1305 at its predefined end date, or be manually upgraded to Complete 1304 or Promoted 1306. An Expired test continues to collect data until it is manually Completed or Promoted. A Complete test no longer collects data. The Control test cell is displayed on the site in place of the test cells. However, test cells may still be Promoted, or the test can be Retired 1307. A Retired test is one that has ended without a winner being promoted.

TABLE 3

Test Cell Staging

| Test Cell Stage | Description |
|---|---|
| New | Site test is new until the administrator has finished the wizard<br>New site tests should not appear in listing screen |
| Pending Start | Site test is pending start if the wizard is finished but the start date is not yet reached<br>Site test is still editable |
| In Progress | Site test can no longer be edited<br>Test can be extended or ended, or a cell can be promoted. |
| Expired | The current date is after the end date<br>Data is still collected until the test is retired or promoted |
| Complete | The site test is ended manually by the test administrator using the control console<br>Data is no longer collected<br>Control offer is displayed on site - other offers are no longer displayed on shopper site<br>A cell in the test can still be promoted, or the test can be retired |
| Promoted | Once a test cell has been full-scaled the test is considered promoted<br>Data is no longer collected<br>Winning offer is displayed on site; losing offers are no longer displayed on shopper site<br>Test is considered complete |
| Retired | Entire test and all offers associated with the test are retired, excluding the offer associated with a promoted cell, if any<br>Test is considered archived<br>No further actions can be performed on the test |

Figure 14:
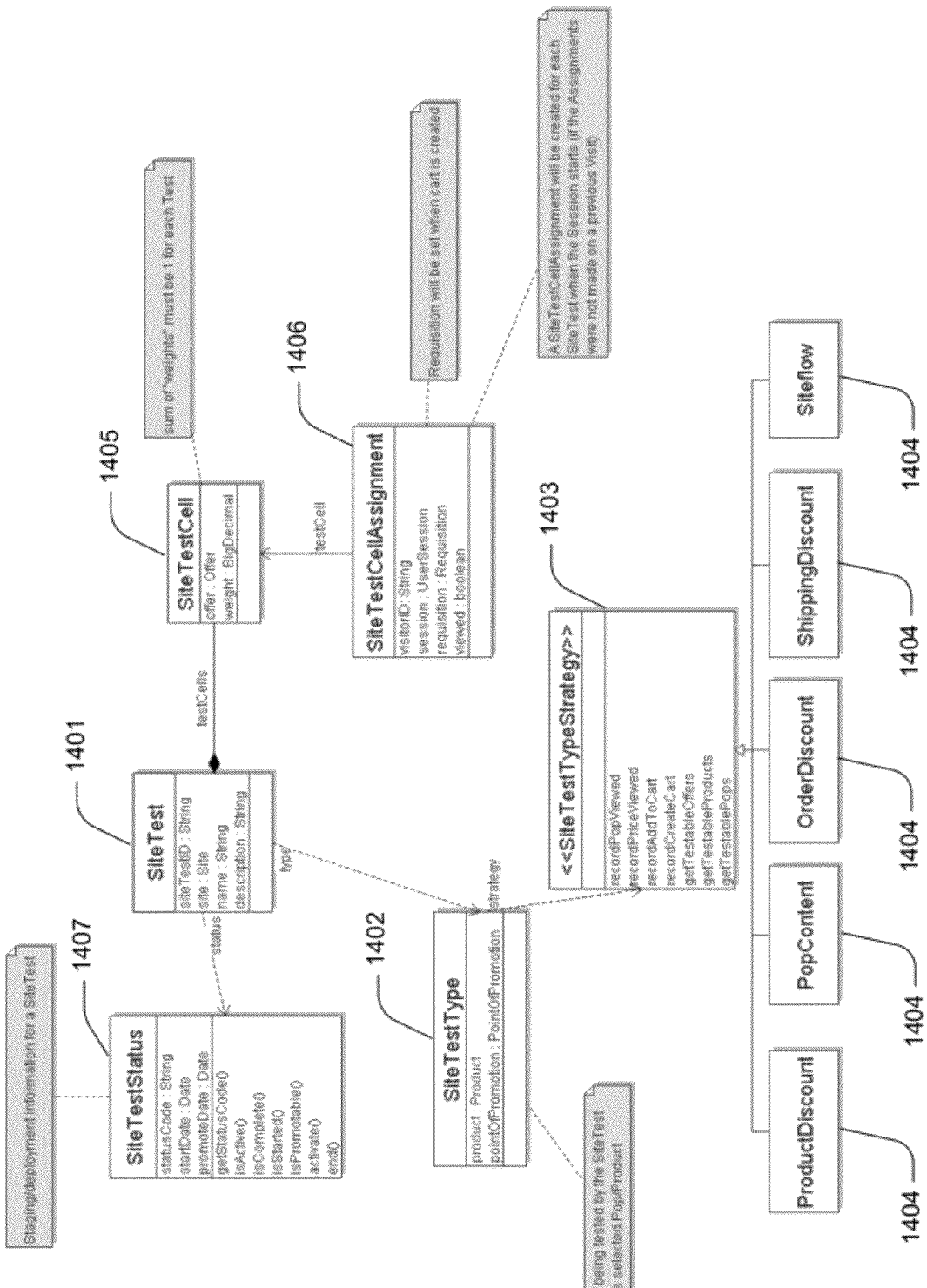
FIG. 14 is a class diagram describing an implementation of site optimizer.

The class diagram in FIG. 14 shows an example of how the site optimizer system and functions may be implemented. Each type of test 1401 is associated with a test strategy 1402. A site test 1403 contains two or more test cells 1404 with test cell assignments for tracking the session and requisition (if a shopping cart is opened) 1405. The site test is associated with one or more products and PoPs 1405. Staging and deployment status is tracked for each test 1406.

When the shopper first visits the site, the system calculates a random percentage between 0 and 100%. The shopper is randomly assigned to a test cell using that percentage and the traffic segmentation assigned to test cells. When test offers are loaded into the shopper's session, the offers from the assigned test cells override the normal offer arbitration process to ensure that the user gets the test cell to which they are assigned.

A key feature of the site optimizer is its ability to maintain continuity of the offer throughout the shopper's experience. This is accomplished using an encrypted cookie, which stores the test cell assignment, allowing the offer to be maintained throughout the entire shopping session. Continuity is maintained even if the shopper navigates away from the site and returns, or closes the browser. In a preferred embodiment, once the shopper submits an order the cookies are cleared and the order is completed. A shopper entering the site after completing an order is assigned a new test cell per the randomization mechanism. FIG. 15 shows how the site optimizer looks from a user's point of view, with two cells 1502 and 1504 displaying different offer banners that are randomly assigned to shoppers. It should be noted that the test assignments between the two cells is truly random where the assignments are done when a new session is started and the same test cell is maintained during the entire shopping session. After the session, a re-assignment occurs by clearing the cookies on a completed order.

Figure 16:
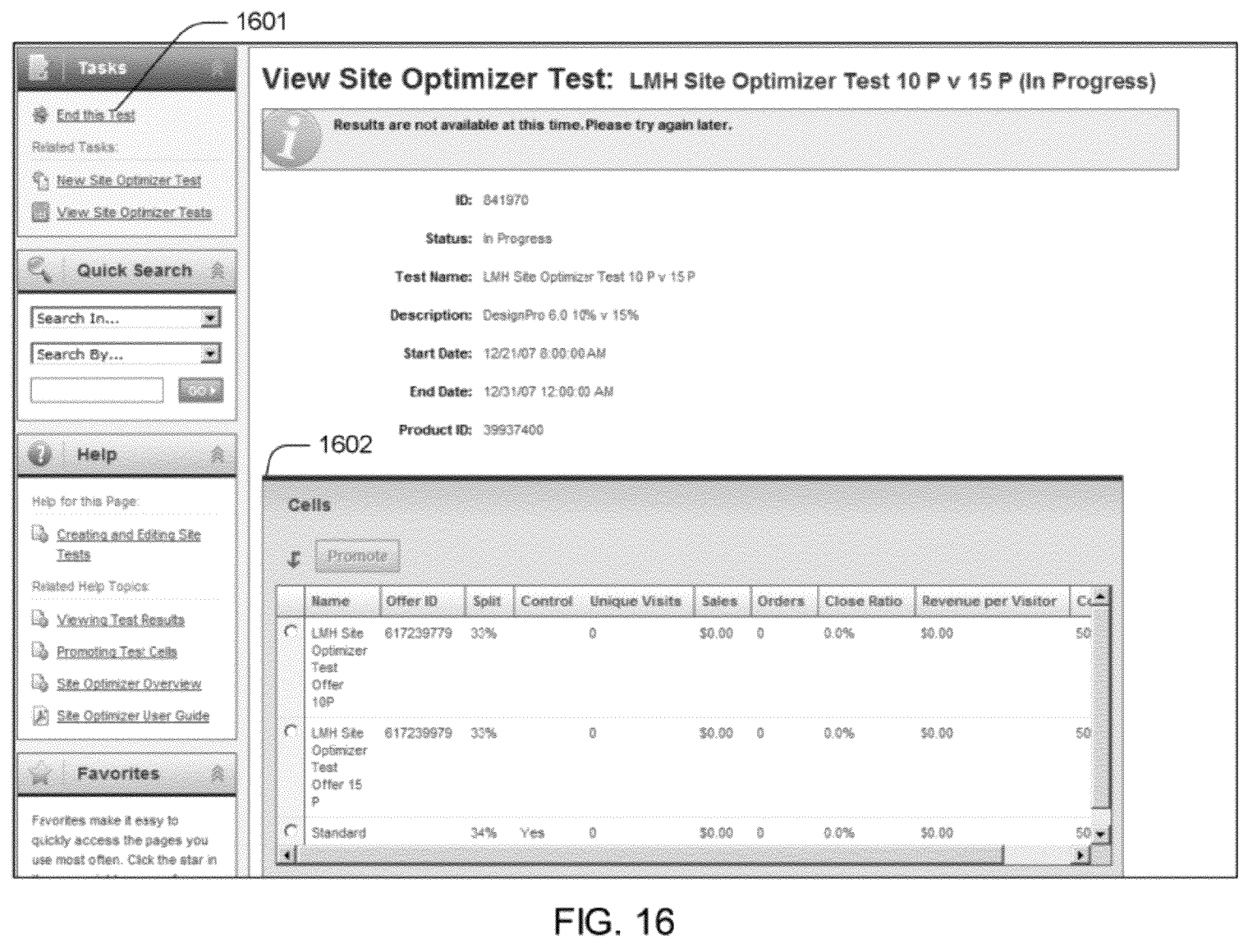

The user may manually end at any time or may allow the test to expire according to the preset schedule. To manually end the test, the user navigates to the Site optimizer as shown in FIG. 16 summary, and may do one of three things: End Test 1601, to stop the test on the store temporarily; Promote 1602 a cell, if the test achieved strong results on a cell and the user wishes to promote it to the store for all visitors to see; and Done, which stops the test and data collection permanently without selecting and promoting a winner.

If the user chooses to promote a cell, it becomes an active offer, fully deployed on the site and the user can manage it like any other merchandising offer.

If the system detects offers that may interfere with the test the user is promoting, the system displays a message listing the conflicting offers. Any offers that will interfere with the test cell being promoted should be retired.

Viewing Performance

As it runs on the user's site, Site optimizer gathers data as the cells are visited by shoppers. Test performance can be viewed while the test is live or after it has been completed.

To view the test results, the user navigates to the Site Optimizer Tests list page and selects the name of the test that they want to view. Clicking the name link redirects the user to the View Site Optimizer Tests page.

Table 4 lists the data provided in this preferred embodiment site optimizer.

TABLE 4

Reporting Data

| Element | Description |
| --- | --- |
| Name | The name of the test cell. |
| Offer ID | The unique ID for the merchandising offer assigned o the test cell. |
| Split | The percentage of shopper traffic shown each test cell. |
| Control | This designates the test cell as the control group within the test. |
| Unique Visits | Totals the number of unique visits that have been assigned to the test cell. |

TABLE 4-continued

Reporting Data

| Element | Description |
| --- | --- |
| Sales | This is sales revenue on a demand basis (sales that are submitted into the store). This data does not include the impact of back-orders, fraud, returns, physical shipments, etc. |
| Orders | A count of unique orders for that test cell on a demand basis. |
| Close Ratio | Calculated as Carts Opened/Orders Submitted. |
| Revenue per Visitor | Calculated as Sales Revenue/Unique Visitors. Note: The system tracks the statistical significance of the Revenue-per-Visitor measure. When a specific test cell is computed to be statistically stronger than the other cells, the test cell is shown as BOLD. This visual indication provides a way to know that the test cell is winning. |

Figure 17:
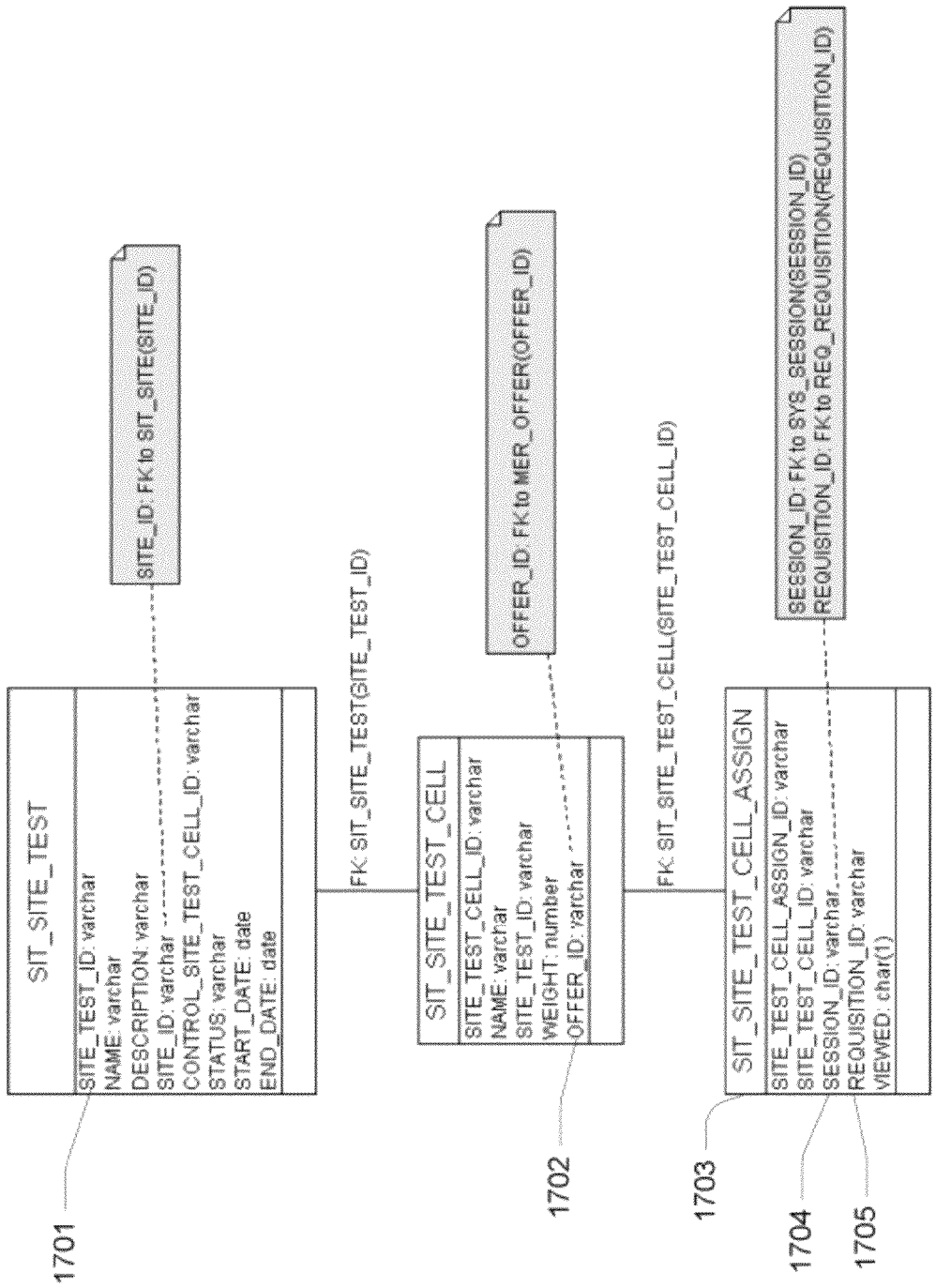
FIG. 17 is a class diagram for a preferred embodiment reporting module.

A sample data model for use in generating reports is shown in FIG. 17. In this embodiment, the test cell performance is tracked with a site ID 1701 and an offer id 1702, which are associated with the test cell assignment to the shopper 1703. The test cell assignment uses the session id 1704 to track the behavior of an individual shopper, and a requisition id 1705 to track shopping cart behavior and sales. Revenue is pulled from the standard requisition table for the purpose of calculating sales and revenue per visitor.

Reporting is critical to determine a winning test approach and making decisions about what to do with each test cell. The performance of a test can be viewed while the test is live, or after it has completed. The user can decide, based on the results of the test, if the test should continue or end. If the test shows strong results, the user may promote the winning test cell at any time. The test results screen shows each test with its traffic segmentation, number of unique visitors, sales revenue, number of orders, close ratio, revenue per visitor and confidence rating.

The preferred embodiment as described uses a standard cumulative distribution function (CDF) to calculate the performance of each test cell in the test. The key factor here is the Confidence rating. When testing one offer against another, the offer or cell with the highest Confidence score should be promoted to the site. A confidence rating of 95% is a clear winner.

Site Optimizer Testing

Siteflow Tests

Site operators wishing to optimize the flow of web pages as the shopper moves through the site may perform a siteflow test. Siteflow tests require the assistance of a web designer, as the test may involve creating new pages and page flow.

Each web site is built from a set of templates containing JSP code that controls the display of content on the page and drives the way the site pages reference one another. The template code contains a site flow JSP servlet that translates the code into siteflow actions, invoking a rule engine to execute a rule associated with a user's click, then translates the siteflow response into an appropriate http response.

The rule engine is a platform-wide system of expression and rule-in-context classes that enable dynamic and customizable logic to drive web site appearance and behavior.

Common Siteflow Terms

The structural elements of a Site include Actions, Pages, Siteflow, ActionHandlers, DisplayPages and Steps. These elements are defined below:

Site: A Site represents a single URL in the system. Sites are associated with zero or more Actions and Pages. A site has one and only one site flow. Each site is described by the Site Definition XML. The XML file defines the available Pages, Steps, and ActionHandlers (defined below) for the system, as well as the context or input and output contracts for each Page and ActionHandler.

Action: Actions are mnemonics for an operation or sequence of operations. They identify a navigation action taken by the user. For example, if the user wanted to display a "get Free Accessories!" image describing promotions in order to increase the value of the order, the sequence of pages and operations executed are identified by the action "Get Free Accessories." When actions are defined in the site, zero or more parameters are associated with them. These parameters define the contract for the JSP page developer to invoke the action. Input and output parameters can be defined to describe this contract.

Page: In order to be used by the Siteflow system, new pages must be registered with the site first. Similar to Actions, Pages may also be associated with zero or more parameters. These parameters must be provided in order to actually display the page (i.e. perform the jsp forward.) Once a page is registered with the site, it may then be referenced within the siteflow. Pages will be associated with zero or more parameters. These parameters defined the contract for the JSP page develop that plans to invoke the action. Input parameters correspond to URL parameters. Output parameters are currently not used.

Siteflow: A Siteflow is a collection of rules organized into Action-Response sequences called ActionHandlers. ActionHandlers start with an Action that the user performs and ends in http contents displayed to that user as a response.

ActionHandler: An ActionHandler is a rule that a user places into a given Siteflow to "handle" invocations of a particular Action. It always starts with a mnemonic and ends in a page being displayed to the user. An example of an ActionHandler is "SearchOrders," which displays a SearchOrder page. A siteflow is comprised of one or more ActionHandlers.

DisplayPage: A DisplayPage is a small-grained rule that a user places into a given ActionHandler. A DisplayPage operation is a directive to the Siteflow system to display a particular Page at a specific point in the flow.

Step: A Step is a rule that represented a small unit of program logic (e.g. Send an e-mail, update an order record, insert a log record, etc.). It is always self-contained in terms that it always specifies its own inputs and outputs. A Step is always coded by a Java programmer. Steps are not modified for Siteflow tests.

Next the discussion continues with how these elements interact with Site optimizer to perform a Site Flow test.

Siteflow tests come in two flavors: action tests and JSP tests. Conducting these tests requires manual modification of the code behind the web page templates. Test name and cell name are used to identify the test and cell in the action handler script and JSP tag. For this reason, test names should be unique for the given site, otherwise unintended behavior may result. Cell names must be unique within a given test.

Action tests change the site's flow by changing the page that a shopper goes to for a given action. An example of an action test is shown in Table 5. This test could be used to route to a Quick Buy page, rather than the normal shopping cart; skip the confirm order page; or route shoppers to different landing pages. In the example below, an action is used to determine whether to direct the shopper to a Confirm Order page, or to skip it and go directly to placing the order.

To create this test, the site designer logs into Site optimizer and creates two cells—"Show Review Order" and "Skip Review Order." The "Show Review Order" allows the standard flow to proceed. To create the "Skip Review Order" flow, the designer edits the Action rule on the template for the page to skip, by assigning the name of the test cell just created to the cell assignment and specifying the next page in the flow. If the test is terminated or the name is invalid "cell" will be an empty string and the default case will occur. In this case, it will show the "Confirm Order" page. The test may be previewed as soon as the modification is complete.

TABLE 5

Code for an Action Test

```
//this will never return null
assignments = session.getSiteTestCellAssignments( );
//this will return empty string ("") if test is not valid
cell = assignments.checkCell("Review Order Siteflow Test");
if (cell.equals("Show Review Order")) {
    controller.setNextPage("ConfirmOrderPage");
}
else if (cell.equals("Skip Review Order")) {
    controller.setNextPage(null);
    controller.setNextAction("PlaceRequisition");
}
else {
    //default
    controller.setNextPage("ConfirmOrderPage");
}
```

JSP tests are used to test different page content. A sample of a JSP test is shown in Table 6. Examples of JSP tests are those that hide or show a payment method, hide or show the Continue Shopping button or change the styles of "buy" buttons. The same general procedure is used as is used for Action tests. The site designer creates the test cell names in Site optimizer. In the example below, a test called "Continue Shopping Siteflow Test" has been created with two cells: "show" and "hide." The designer modifies the content element tag to add the "hide" behavior. The default behavior is "show" and is determined by the "default" case. This page will not fail if the test is terminated or the test name is invalid. Instead, the cell will be the empty string—" ", and the default behavior will apply. Again the user may preview the page before deploying into production.

TABLE 6

Code for a JSP test.

```
<dr:defineSiteTestCell id="cell" siteTestName="Continue Shopping Siteflow Test"/>
<!--
SITE TEST cell=<bean:write name="cell"/>
-->
<bean:define id="showContinueShoppingButton" value="true"/>
```

TABLE 6-continued

Code for a JSP test.

```
<logic:switch name="cell">
    <logic:case op="equal" value="Show">
        <!-- SITE TEST: Show -->
        <bean:update id="showContinueShoppingButton" value="true"/>
    </logic:case>
    <logic:case op="equal" value="Hide">
        <!-- SITE TEST: Hide -->
        <bean:update id="showContinueShoppingButton" value="false"/>
    </logic:case>
    <logic:default>
        <!-- SITE TEST: Default -->
        <bean:update id="showContinueShoppingButton" value="true"/>
    </logic:default>
</logic:switch>
<!--
SITE TEST cell=<bean:write name="showContinueShoppingButton"/>
-->
<logic:equal name="showContinueShoppingButton" value="true">
    <logic:if name="site" property="DISPLAY_BUTTONS_AS_IMAGES" value="yes" op="equal">
        <logic:then>
            <a href="<dr:action actionName="ContinueShopping"/>" onClick="q=false">
                <img src="<dr:url template="true" i18n="true" rscName="sc_continueshopping.gif"/>" />
            </a>
        </logic:then>
        <logic:else>
            <a href="<dr:action actionName="ContinueShopping"/>" class="dr_button" onclick="q=false">
                <dr:resource key="BTN_CONTINUE_SHOPPING"/>
            </a>
        </logic:else>
    </logic:if>
</logic:if>
```

Once site design has deployed the test, the site operator may view the results as described above for merchandising offers.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A computer system based including a server with a processor and a memory, having a site optimizer integrated with an electronic commerce platform, the site optimizer comprising:

test creation software module stored in the server memory and containing program code which when executed by the processor in the server causes the server to perform operations of configuring a site optimizer test having a first and a second offer cell and a site traffic segmentation rule that defines a percentage of incoming site traffic to direct to the first offer cell and a remaining percentage of incoming site traffic to direct to the second offer cell such that 100 percent of incoming site traffic is defined to be directed to one of the first and the second offer cells; and test deployment module stored in the server memory and containing program code which when executed by the processor in the server causes the server to perform operations of executing the site optimizer test by randomly assigning one of the first and second offer cells to each shopping session in accordance with the site traffic segmentation rule such that a shopper is directed to only one assigned offer cell within the site optimizer test, the test deployment module maintaining continuity of the offer cell for a particular shopper throughout each shopping session by checking for an offer cell assignment cookie for the particular shopper which stores the offer cell assignment and utilizing such stored offer cell assignment for the shopping session when the cookie exists, and the test deployment module setting a cookie as a unique session identifier for a shopping session when no offer cell assignment cookie exists for the particular shopper.

2. The system of claim 1 wherein the test creation software module further comprises program code which when executed by the processor in the server causes the server to perform operations of creating a site optimizer test having a third offer cell.

3. The system of claim 1 wherein the test creation software module further comprises program code which when executed by the processor in the server causes the server to perform operations of creating each offer cell based on an existing product catalog associated with the electronic commerce platform.

4. The system of claim 1 wherein the test creation software module further comprises program code which when executed by the processor in the server causes the server to perform operations of creating each offer cell with a particular offer type, the particular offer type being selected from a group consisting of: content, product discount, order discount, product shipping discount, order shipping discount, cross-sell, up-sell, and bundle products.

5. The system of claim 1 wherein the test creation software module further comprises program code which when executed by the processor in the server causes the server to perform operations of creating a first and a second siteflow within site optimizer test, each siteflow comprising a collection of action handlers that determine a sequence of interactions with a shopper.

6. The system of claim 1 wherein the test creation software module further comprises program code which when executed by the processor in the server causes the server to perform operations of selecting offer related parameters for each offer cell.

7. The system of claim 1 wherein the test creation software module further comprises program code which when executed by the processor in the server causes the server to perform operations of obtaining user input when defining the site traffic segmentation rule.

8. The system of claim 1 wherein the test deployment module further comprises program code which when executed by the processor in the server causes the server to perform operations of clearing an existing cookie after an order is completed.

9. The system of claim 1 wherein the test deployment module further comprises program code which when executed by the processor in the server causes the server to perform operations of gathering test statistics about the site optimizer test.

10. The system of claim 9 wherein the test deployment module further comprises a reporting module containing program code which when executed by the processor in the server causes the server to perform operations of generating reports about the site optimizer test based on the gathered test statistics.

11. A method for optimizing a storefront site associated with an electronic commerce platform, the method comprising steps of:
configuring a site optimizer test having a first and a second offer cell and a site traffic segmentation rule that defines a percentage of incoming site traffic to direct to the first offer cell and a remaining percentage of incoming site traffic to direct to the second offer cell such that 100 percent of incoming site traffic is defined to be directed to one of the first and the second offer cells;
executing the site optimizer test by randomly assigning one of the first and second offer cells to each shopping session in accordance with the site traffic segmentation rule such that a shopper is directed to only one assigned offer cell within the site optimizer test;
maintaining continuity of the offer cell for a particular shopper throughout each shopping session by:
checking for an offer cell assignment cookie for the particular shopper which stores the offer cell assignment and utilizing such stored offer cell assignment for the shopping session when the cookie exists; and
setting a cookie as a unique session identifier for each shopper session when no offer cell assignment cookie exists for the particular shopper.

12. The method of claim 11 wherein configuring step comprises creating a site optimizer test having a third offer cell.

13. The method of claim 11 wherein configuring step comprises creating each offer cell based on an existing product catalog associated with the electronic commerce platform.

14. The method of claim 11 wherein configuring step comprises creating each offer cell with a particular offer type, the particular offer type being selected from a group consisting of: content, product discount, order discount, product shipping discount, order shipping discount, cross-sell, up-sell, and bundle products.

15. The method of claim 11 wherein configuring step comprises creating a first and a second siteflow within site optimizer test, each siteflow comprising a collection of action handlers that determine a sequence of interactions with a shopper.

16. The method of claim 11 wherein configuring step comprises selecting offer related parameters for each offer cell.

17. The method of claim 11 wherein configuring step comprises obtaining user input when defining the site traffic segmentation rule.

18. The method of claim 11 further comprising a step of clearing an existing cookie after an order is completed.

19. The method of claim 11 further comprising a step of gathering test statistics about the site optimizer test.

20. The method of claim 19 further comprising a step of generating reports about the site optimizer test based on the gathered test statistics.

* * * * *